US012665516B2

(12) United States Patent
Zhang et al.

(10) Patent No.: US 12,665,516 B2
(45) Date of Patent: Jun. 23, 2026

(54) BOOST-TYPE CONVERTER AND DRIVING CIRCUIT FOR DRIVING HIGH-SIDE SWITCHING TRANSISTOR THEREOF

(71) Applicant: SG MICRO CORP, Beijing (CN)

(72) Inventors: Haibo Zhang, Beijing (CN); Linghua Huang, Beijing (CN)

(73) Assignee: SG MICRO CORP, Beijing (CN)

( * ) Notice: Subject to any disclaimer, the term of this patent is extended or adjusted under 35 U.S.C. 154(b) by 125 days.

(21) Appl. No.: 18/559,581

(22) PCT Filed: Aug. 18, 2022

(86) PCT No.: PCT/CN2022/113215
§ 371 (c)(1),
(2) Date: Nov. 8, 2023

(87) PCT Pub. No.: WO2023/040566
PCT Pub. Date: Mar. 23, 2023

(65) Prior Publication Data
US 2024/0235371 A1     Jul. 11, 2024

(30) Foreign Application Priority Data

Sep. 17, 2021     (CN) .......................... 202111092118.8

(51) Int. Cl.
*H02M 3/158* (2006.01)
*H02M 1/00* (2006.01)
*H02M 1/08* (2006.01)

(52) U.S. Cl.
CPC ......... *H02M 3/1588* (2013.01); *H02M 3/158* (2013.01); *H02M 1/0009* (2021.05); *H02M 1/0016* (2021.05); *H02M 1/08* (2013.01)

(58) Field of Classification Search
CPC ...... H02M 1/0009; H02M 1/08; H02M 1/088; H02M 3/156; H02M 3/158; H02M 3/1588
See application file for complete search history.

(56) References Cited

U.S. PATENT DOCUMENTS 5,747,977 A * 5/1998 Hwang ............... H02M 3/3353
                                                    323/283
8,022,680 B2 9/2011 Ryoo
(Continued)

FOREIGN PATENT DOCUMENTS

CN     101277061 B     7/2012
CN     104170229 A     11/2014
(Continued)

OTHER PUBLICATIONS

First Office Action, including Search Report, for Chinese Patent Application No. 202111092118.8, dated Mar. 6, 2024, 24 pages.
(Continued)

*Primary Examiner* — Gary L Laxton
(74) *Attorney, Agent, or Firm* — Westman, Champlin & Koehler, P.A.

(57) ABSTRACT

A Boost-type converter and a driving circuit for driving a high-side switching transistor thereof includes an input voltage sensing unit, an oscillator, a logic unit, and a high-side driving unit. The logic unit receives an input voltage detection signal, a clock signal and a pulse width modulated signal, and generates a control signal according to the input voltage detection signal, the clock signal and the pulse width modulated signal. The high-side driving unit generates a driving signal of a high-side switching transistor for driving the high side switching transistor according to the control signal. When the input voltage is greater than a predetermined voltage, the high-side driving unit controls
(Continued)

the high-side switching transistor to be in a weak-conduction state or off state for a time period of an inductor current discharge phase.

9 Claims, 7 Drawing Sheets

(56)                    References Cited

U.S. PATENT DOCUMENTS

| | | | | |
|---|---|---|---|---|
| 8,063,615 | B2 * | 11/2011 | Canfield | H02M 3/1588 |
| | | | | 323/233 |
| 9,385,602 | B2 | 7/2016 | Ohashi | |
| 10,727,734 | B2 | 7/2020 | Gritti | |
| 11,336,172 | B2 | 5/2022 | Gritti | |
| 11,581,803 | B2 | 2/2023 | Xu | |
| 11,626,877 | B2 | 4/2023 | Niikura | |
| 2002/0140408 | A1 * | 10/2002 | Hwang | H02M 3/156 |
| | | | | 323/224 |
| 2006/0208714 | A1 * | 9/2006 | Saeki | H02M 3/1588 |
| | | | | 323/282 |
| 2009/0058383 | A1 | 3/2009 | Ryoo | |
| 2010/0246227 | A1 * | 9/2010 | Shimizu | H02M 3/156 |
| | | | | 363/126 |
| 2011/0210710 | A1 * | 9/2011 | Yamamoto | H02M 3/156 |
| | | | | 323/282 |
| 2011/0316511 | A1 * | 12/2011 | Wang | H02M 3/156 |
| | | | | 323/285 |
| 2012/0268094 | A1 * | 10/2012 | Scaldaferri | H02M 3/156 |
| | | | | 323/284 |
| 2013/0033248 | A1 * | 2/2013 | Granger | H02M 3/1588 |
| | | | | 323/288 |
| 2014/0375295 | A1 * | 12/2014 | Ito | H02M 3/158 |
| | | | | 323/300 |
| 2014/0376281 | A1 | 12/2014 | Ohashi | |
| 2016/0056712 | A1 * | 2/2016 | Chen | H02M 1/44 |
| | | | | 323/271 |
| 2018/0278152 | A1 | 9/2018 | Gritti | |
| 2019/0036448 | A1 * | 1/2019 | Terui | H02M 1/4225 |
| 2020/0321855 | A1 | 10/2020 | Gritti | |
| 2020/0382122 | A1 | 12/2020 | Niikura | |
| 2021/0328504 | A1 | 10/2021 | Xu | |

FOREIGN PATENT DOCUMENTS

| | | |
|---|---|---|
| CN | 206559232 U | 10/2017 |
| CN | 108631578 A | 10/2018 |
| CN | 111865052 A | 10/2020 |
| CN | 112019001 A | 12/2020 |
| JP | 2015216818 A | 12/2015 |
| TW | 200910746 A | 3/2009 |

OTHER PUBLICATIONS

International Search Report and Written Opinion for International Application No. PCT/CN2022/113215, dated Oct. 24, 2022, 8 pages.
Chinese Office Action for Chinese Patent Application No. CN202111092118.8, dated Sep. 21, 2024, 16 pages.
Chinese Third Reveiw Opinion Notice for Chinese Patent Application No. CN202111092118.8, dated Jan. 15, 2025, 18 pages.
Chinese Rejection Decision for Chinese Patent Application No. CN202111092118.8, dated Mar. 29, 2025, 18 pages.

* cited by examiner

BOOST-TYPE CONVERTER AND DRIVING CIRCUIT FOR DRIVING HIGH-SIDE SWITCHING TRANSISTOR THEREOF

CROSS-REFERENCES TO RELATED APPLICATION(S)

This application is a Section 371 National Stage application of International Application No. PCT/CN2022/113215, filed on Aug. 18, 2022, which published as WIPO Publication No. WO 2023/040566 A1, on Mar. 23, 2023, not in English, and claims priority to Chinese patent application No. 202111092118.8, filed on Sep. 17, 2021, entitled "BOOST-TYPE CONVERTER AND DRIVING CIRCUIT FOR DRIVING HIGH-SIDE SWITCHING TRANSISTOR THEREOF", the entire contents of which are incorporated herein by reference in their entireties.

FIELD OF TECHNOLOGY

The present disclosure relates to the technical field of power supply, in particular to a Boost-type converter and a driving circuit for driving a high-side switching transistor thereof.

BACKGROUND

Switching converter has been widely used in many electronic systems to generate an operating voltage and a supply current required by internal circuit modules or loads. The switching converter includes a power switching transistor to control the transfer of electrical energy from an input terminal to an output terminal, thus providing a constant output voltage and/or output current at the output terminal. In the switching converter, the constant on-time control method based on ripple has been widely used in recent years, because of its advantages of good light load efficiency, fast transient response and easy implementation.

FIG. 1 is a schematic circuit diagram of an asynchronous rectification Boost-type converter according to the prior art. As shown in FIG. 1 the Boost-type converter 100 includes a switching transistor Q1, an inductor Lx, a rectifier diode D1, an error amplifier EA and a control circuit 110. The inductor Lx has a first end being coupled with an input voltage Vin, and a second end being coupled with a drain of switching transistor Q1, and a source of switching transistor Q1 is grounded. The anode of the rectifier diode D1 is coupled to an intermediate node of the inductor Lx and the switching transistor Q1, and the cathode of the rectifier diode D1 is coupled to the output voltage Vout. The error amplifier EA has a non-inverted input terminal for receiving a reference voltage VREF, and an inverted input terminal for receiving a feedback voltage VFB of the output voltage Vout. For example, the feedback voltage VFB of the output voltage Vout can be obtained by a voltage dividing network consisting of resistors R1 and R2. The error amplifier EA is used for obtaining an error voltage Vea between the feedback voltage VFB and the reference voltage VREF. The control circuit 110 is used for controlling on and off states of the switching transistor Q1 according to the error voltage Vea to realize voltage conversion. The Boost-type converter 100 also includes an input capacitor Ci and an output capacitor Co for rectification and filtering of the input voltage Vin and the output voltage Vout respectively.

In the asynchronous rectification Boost-type converter 100, a switching duty cycle of the switching transistor Q1 is $D=(Vout+Vd-Vin)/(Vout+Vd)$, where Vd represents a forward voltage drop of the rectifier diode D1. When the input voltage Vin gradually approaches the output voltage Vout, the switching duty cycle D of switching transistor Q1 will become smaller and smaller. When $Vin=Vout+Vd$, the switching transistor Q1 has the switching duty cycle $D=0$, which causes the circuit to not function properly. Therefore, the asynchronous rectification Boost-type converter 100 has the input voltage Vin range that is limited by the switching duty cycle and cannot work close to the output voltage Vout.

FIG. 2 is a schematic circuit diagram of a synchronous rectification Boost-type converter according to the prior art. As shown in FIG. 2, Boost-type converter 200 includes a switching transistor Q1 (also referred to as low-side switching transistor), a switching transistor Q2 (also referred to as high-side switching transistor), an inductor Lx, an error amplifier EA, and a control circuit 110. The inductor Lx has a first end being coupled with an input voltage Vin, a second end being coupled with a drain of the low-side switching transistor Q1, and a source of the low-side switching transistor Q1 is grounded. The drain of the high-side switching transistor Q2 is coupled to an intermediate node of the inductor Lx and the low-side switching transistor Q1, and the source of the high-side switching transistor Q2 is coupled to the output voltage Vout. The error amplifier EA has a non-inverted input for receiving a reference voltage VREF, and an inverted input terminal for receiving a feedback voltage VFB of the output voltage Vout. For example, the feedback voltage VFB of the output voltage Vout can be obtained by a voltage dividing network consisting of resistors R1 and R2. The error amplifier EA is used for obtaining an error voltage Vea between the feedback voltage VFB and the reference voltage VREF. The control circuit 110 is used for controlling on and off states of the low-side switching transistor Q1 and the high-side switching transistor Q2 according to the error voltage Vea to realize voltage conversion. The Boost-type converter 200 also includes an input capacitor Ci and an output capacitor Co for rectification and filtering of the input voltage Vin and the output voltage Vout respectively.

For an ideal synchronous rectification Boost-type converter, a switching duty cycle of the low-side switching transistor Q1 is $D=(Vout-Vin)/Vout$. For a non-ideal synchronous rectification Boost-type converter, the switching duty cycle of the low-side switching transistor Q1 is $D=(Vout+Vf-Vin)/(Vout+Vf)$, where Vf represents the forward voltage drop of the high-side switching transistor Q2. When input voltage Vin gradually approaches the output voltage Vout, the switching duty cycle D of the low-side switching transistor Q1 will become smaller and smaller. When $Vin=Vout+Vf$, the low-side switching transistor Q1 has the switching duty cycle $D=0$, which causes the circuit to not function properly. Therefore, the synchronous rectification Boost-type converter 200 also has the input voltage Vin range that is limited by the switching duty cycle and cannot work close to the output voltage Vout.

As known from the above discussion, the input voltage Vin of the conventional Boost-type converters 100 and 200 are both limited by the switching duty cycle D and cannot be extended to be very close to the output voltage Vout. For example, assuming that the minimum on time of the low-side switching transistor Q1 is Tmin and the switching cycle is T, the maximum input voltage $Vin\_max=(1-Tmin/T)\times Vout$ for the conventional Boost-type converters to function properly. Typically, the output voltage Vout and the switching cycle T are fixed, so the maximum input voltage Vin_max of Boost-type converter is mainly limited by the minimum on time Tmin of the low-side switching transistor Q1, which cannot be very close to the output voltage Vout.

Moreover, when the input voltage Vin gradually approaches the output voltage Vout, the duty cycle of the low-side switching transistor Q1 decreases, and the on time of low-side switching transistor Q1 will become very small. The circuit will need a current sampling circuit with critical requirement, and the circuit is prone to oscillation and is difficult to function properly.

In order to solve the above problems, a new type of Boost-type converter is urgently needed in the art.

SUMMARY OF THE DISCLOSURE

In view of the above problems, one object of the present disclosure is to provide a Boost-type converter and a driving circuit for driving a high-side switching transistor. When an input voltage is close to an output voltage, there is no need to reduce a switching duty cycle of the circuit, so that the circuit can provide a stable power supply and improve an overall efficiency of the Boost-type converter.

According to one aspect of the the present disclosure, there is provided a driving circuit for driving a high-side switching transistor of a Boost-type converter, comprising: an input voltage sensing unit for detecting an input voltage of the Boost-type converter and generating an input voltage detection signal; an oscillator for generating a clock signal; a logic unit for receiving the input voltage detection signal, the clock signal and a pulse width modulated signal, and for generating a control signal according to the input voltage detection signal, the clock signal and the pulse width modulated signal; and a high-side driving unit for generating a driving signal of a high-side switching transistor for driving the high side switching transistor according to the control signal, wherein, when the input voltage is greater than a predetermined voltage, the high-side driving unit controls the high-side switching transistor to be in a weak-conduction state or off state at least at a time period of an inductor current discharge phase.

Optionally, when the input voltage is greater than the predetermined voltage, each switching cycle of the driving signal of the high-side switching transistor includes at least first to third time periods, so that the high-side switching transistor is in an off state in the first time period, in a weak-conduction state or off state in the second time period, and in a strong-conduction state in the third time period.

Optionally, when the input voltage is greater than the predetermined voltage, a gate voltage provided by the high-side driving unit to the high-side switching transistor in the second time period is slightly greater than a conduction threshold of the high-side switching transistor, so that the high-side switching transistor is in a weak-conduction state.

Optionally, the logic unit determines duration of the second time period according to high-level duration of the clock signal.

Optionally, the oscillator gradually increases the high-level duration of the clock signal in a plurality of subsequent switching cycles when the input voltage is greater than the predetermined voltage.

Optionally, the oscillator gradually increases the high-level duration of the clock signal in a plurality of switching cycles while keeping the high-level duration of the clock signal unchanged in some of the plurality of switching cycles.

Optionally, the logic unit comprises: an AND gate having a first input terminal for receiving the input voltage detection signal, a second input terminal for receiving the clock signal, and an output terminal; and an OR gate having a first input terminal being coupled to the output terminal of the AND gate, a second input terminal for receiving the pulse width modulated signal, and an output terminal for outputting the control signal.

According to another aspect of the present disclosure, there is provided a Boost-type converter, comprising: a high-side switching transistor and a low-side switching transistor, wherein a source of the high-side switching transistor is coupled with an output voltage, a drain of the high-side switching transistor is coupled with a drain of the low-side switching transistor, a source of the low-side switching transistor is coupled to the ground, and an intermediate node between the high-side switching transistor and the low-side switching transistor is a switching node; an inductor which has a first end being coupled with the input voltage, and a second end being coupled with the switching node: an error amplifier which compares a feedback voltage of the output voltage with a reference voltage to obtain an error voltage between the feedback voltage and the reference voltage; a control circuit which generates a pulse width modulated signal according to the error signal to control on and off states of the high-side switching transistor and the low-side transistor; and the above-mentioned driving circuit which drives the high-side switching transistor according to the pulse width modulated signal.

Optionally, the Boost-type converter further comprises: a substrate control circuit for comparing the input voltage with the output voltage and controlling a substrate bias of the high-side switching transistor according to the comparison result.

Optionally, the substrate control circuit controls the high-side switching transistor to couple its substrate with its source when the input voltage is less than or equal to the output voltage, the substrate control circuit controls the high-side switching transistor to couple its substrate with its drain when the input voltage is greater than the output voltage.

Optionally, the driving circuit is further configured to detect an output current and control a gate voltage of the high-side switching transistor according to the output current to adjust a forward voltage drop of the high-side switching transistor.

In the Boost-type converter and the driving circuit for driving the high-side switching transistor according to the embodiment of the present disclosure, the driving circuit controls a gate voltage of the high-side switching transistor when an input voltage is close to an output voltage, so that the high-side switching transistor is in a weak-conduction state or off state at a time period of an inductor current discharge phase, thereby changing the waveform of the switching node and the inductor current. This ensures that the voltage at the switching node is greater than the output voltage during the time period, thereby solving the problem of a too small duty cycle of the low-side switching transistor when the input voltage is close to the output voltage, and enabling the system to function properly.

Furthermore, when the input voltage is close to the output voltage, the driving circuit of the present disclosure gradually increases the weak-conduction or off time of the high-side switching transistor in a plurality of switching cycles, thereby increasing a conduction time of the low-side switch transistor. This avoids the problem of current sampling failure caused by too short conduction time of the low-side switch transistor, which can lead to system instability. Thus, the system has improved stability.

BRIEF DESCRIPTION OF THE DRAWINGS

The above and other objects, features and advantages of the present disclosure will become more apparent from the following description of the the present disclosure embodiment with reference to the accompanying drawings, in which.

DESCRIPTION OF THE EMBODIMENTS

Figure 1:
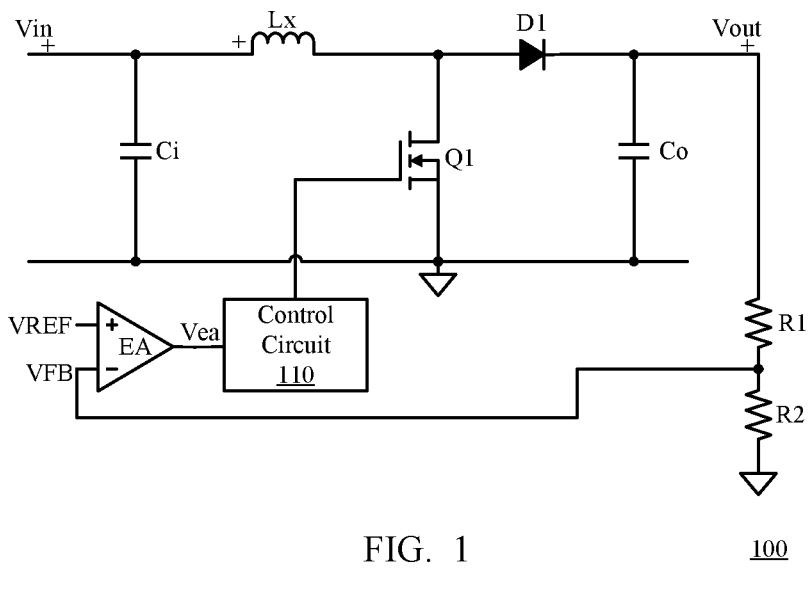
FIG. 1 is a schematic circuit diagram of an asynchronous rectification Boost-type converter according to the prior art.
Figure 2:
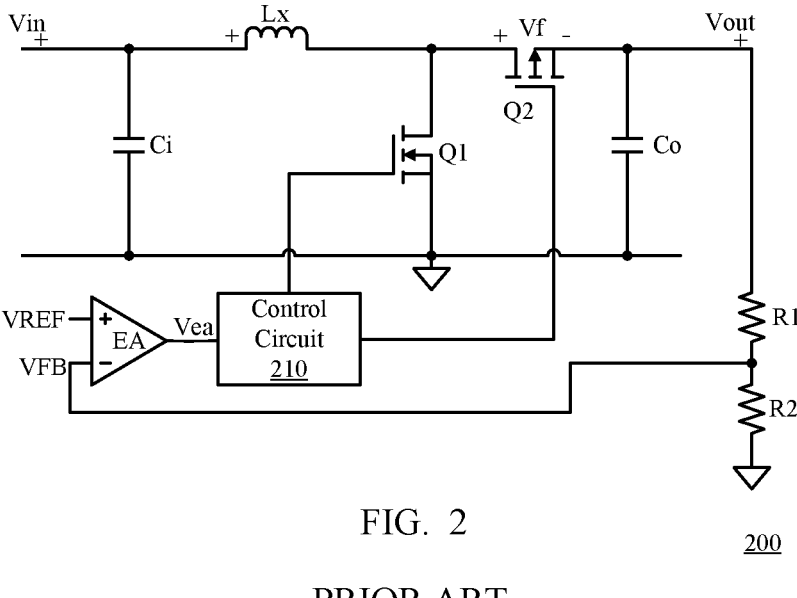
FIG. 2 is a schematic circuit diagram of a synchronous rectification Boost-type converter according to the prior art.

Various embodiments of the the present disclosure will be described in more detail below with reference to the accompanying drawings. Throughout the various figures, like elements are denoted by the same or similar reference numerals. For the sake of clarity, various parts in the drawings are not drawn to scale. Moreover, some well-known parts may not be shown.

It should be understood that in the following description, the term "circuit" refers to a conductive loop formed by at least one component or sub-circuit through an electrical or electromagnetic connection. When a component or circuit is "coupled" to another component, or a component/circuit is "coupled" between two nodes, it may be directly coupled or coupled to another component, or there may be an intermediate element, and the connection between the components may be physical, logical, or a combination thereof. Conversely, when a component is said to be "directly coupled" or "directly connected" to another component, it unit that there is no intermediate element between them.

The present disclosure may be presented in various forms, some examples of which will be described below.

Figure 3:
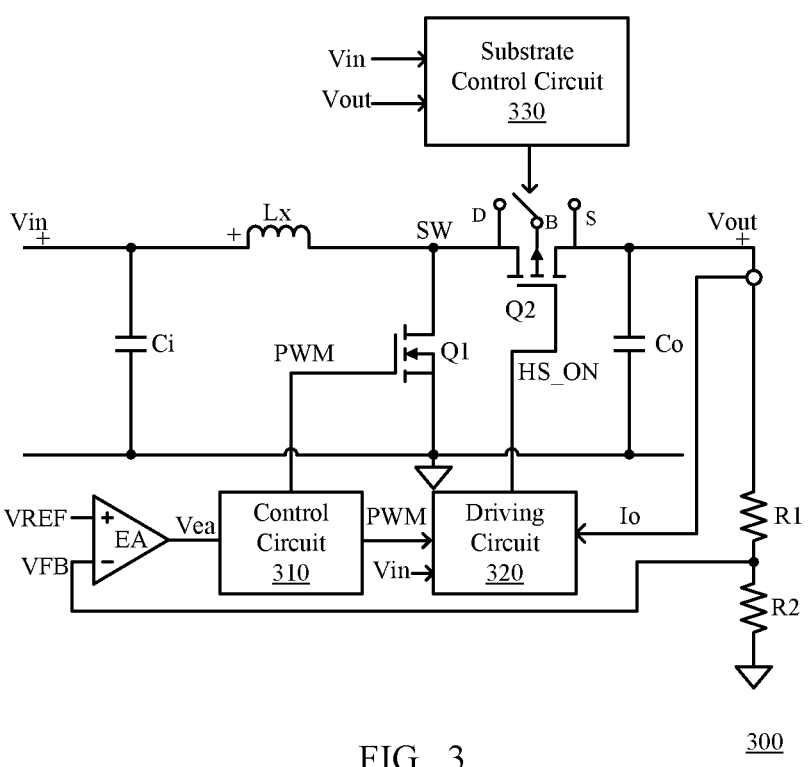
FIG. 3 is a schematic circuit diagram of a synchronous rectification Boost-type converter according to an embodiment of the the present disclosure.

FIG. 3 is a schematic circuit diagram of a synchronous rectification Boost-type converter according to an embodiment of the present disclosure. As shown in FIG. 3, a Boost-type converter 300 includes a switching transistor Q1 (also referred to as low-side switching transistor), a switching transistor Q2 (also referred to as high-side switching transistor), an inductor Lx, an error amplifier EA, a control circuit 310, a driving circuit 320, and a substrate control circuit 330.

The drains of the low-side switching transistor Q1 and the high-side switching transistor Q2 are coupled with each other. An intermediate node between the high-side switching transistor and the low-side switching transistor is a switching node SW. The source of the low-side switching transistor Q1 is grounded, and the source of the high-side switching transistor Q2 is coupled with the output voltage Vout. The inductor Lx has a first end coupled to the input voltage Vin and a second end coupled to the switching node SW.

The Boost-type converter 300 also includes an input capacitor Ci which has, a first end being coupled to the input voltage Vin and a second end being grounded for rectification and filtering of the input voltage Vin, and an output capacitor Co which has a first end being coupled to the output voltage Vout and a second end being grounded for rectification and filtering of the output voltage Vout.

The error amplifier EA has a non-inverted input for receiving a reference voltage VREF, and an inverted input terminal for receiving a feedback voltage VFB of the output voltage Vout. For example, the feedback voltage VFB of output voltage Vout can be obtained by a voltage dividing network consisting of resistors R1 and R2. The error amplifier EA is used for obtaining an error voltage Vea between the feedback voltage VFB and the reference voltage VREF. The control circuit 110 is used for generating a switching transistor PWM that controls on and off states of the low-side switching transistor Q1 and the high-side pulse width modulated signal Q2 according to the error voltage Vea. The driving circuit 320 is used for generating a driving signal HS_ON for a high-side switching transistor for driving the high-side switching transistor Q2 according to the pulse width modulated signal PWM to control a gate voltage of the high-side switching transistor Q2.

When the input voltage Vin is close to the output voltage Vout, the driving circuit 320 is also used to control the gate voltage of the high-side switching transistor Q2, so that the high-side switching transistor Q2 is in a weak-conduction state or off state at a time period of an inductor current discharge phase, thereby changing the waveforms of the switching node SW and the inductor current, so that the voltage of the switching node SW is greater than or greater at a time period than the output voltage Vout by a voltage value ΔVou, so that the system can function properly.

Specifically, the driving signal HS_ON for the high-side switching transistor has a switching cycle. When the input voltage Vin is greater than a predetermined voltage, the switching cycle includes at least first to third time periods. In the first time period, the high-side switching transistor Q2 is in an off state, and since the high-side switching transistor Q2 and the low-side switching transistor Q1 operate in a complementary manner, the low-side switching transistor Q1 is in an on state in the first time period. In the second time period, the high-side switching transistor Q2 is in a weak-conduction state or off state, while the low-side switching transistor Q1 is in a off state. In the third time period, the high-side switching transistor Q2 is in a strong-conduction state, while the low-side switching transistor Q1 is in an off state. From the above description, it can be seen that the whole switching cycle is T=T1+T2+T3, where T1 to T3 respectively represent the first to third time periods. According to the volt-second balance principle, the following relationship can be obtained: Vin×T1=Vout×(T2+T3)+ΔVout×T2. In such a case, if the second time period T2 is relatively large, the on time T1 of the low-side switching transistor Q1 will increase accordingly. The requirements for the current sampling circuit will be reduced, which can reduce the design difficulty. With suitable design, the circuit can function properly when the input voltage Vin is close to or even equal to the output voltage Vout.

The substrate control circuit 330 is used for controlling a substrate bias of the high-side switching transistor Q2. When the input voltage Vin is less than or equal to the output voltage Vout, the substrate control circuit 330 controls the high-side switching transistor Q2 to couple its substrate to its source. When the input voltage Vin is greater than the output voltage Vout, the substrate control circuit 330 controls the high-side switching transistor Q2 to couple its substrate to its drain.

In the present disclosure, because the switching duty cycle is D=(Vout+Vf−Vin)/(Vout+Vf), a forward voltage drop Vf of the high-side switching transistor Q2 can be controlled by controlling a gate voltage of the driving circuit 320, thus controlling the switching duty cycle D. When the input voltage Vin is close to (or even exceeds) the output voltage Vout, the switching duty cycle D of the circuit will not be equal to zero, thereby ensuring the proper operation of the circuit. Moreover, because a resistance loss of the high-side switching transistor Q2 is equal to Io*Vf, the driving circuit 320 can reduce the forward voltage drop Vf of the high-side switching transistor Q2 by controlling the gate voltage of the high-side switching transistor Q2 according to the detected output current Io, thereby reducing the circuit loss, and improving an overall efficiency of the circuit.

Figure 4:
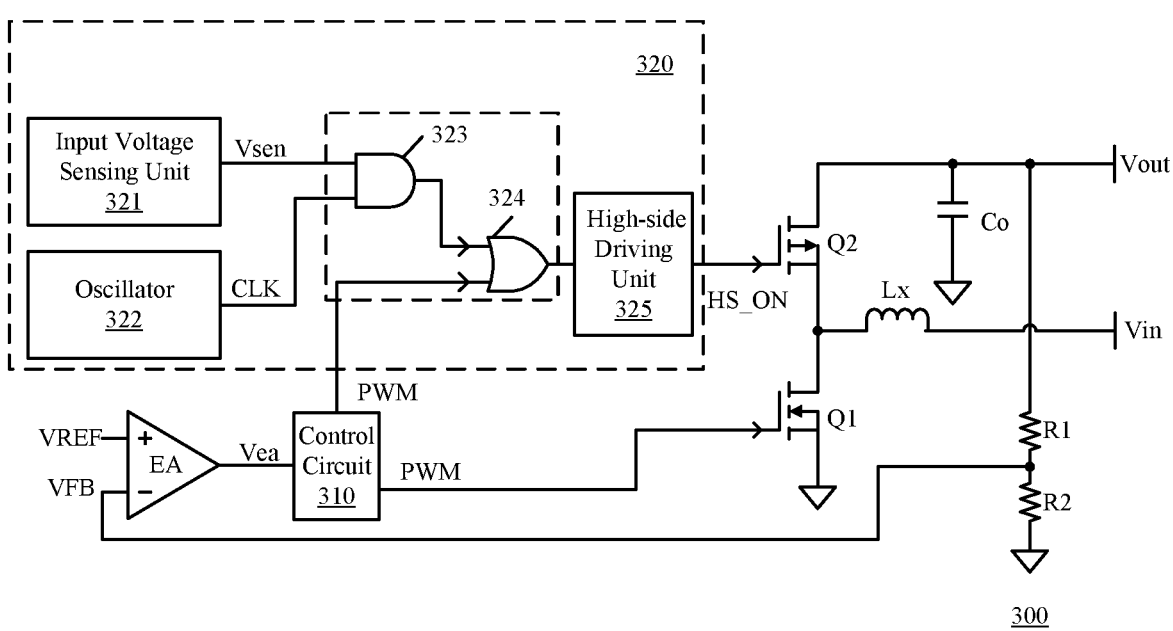
FIG. 4 is a schematic circuit diagram of a driving circuit of a synchronous rectification Boost-type converter according to an embodiment of the the present disclosure.

FIG. 4 is a schematic circuit diagram of a driving circuit of a synchronous rectification Boost-type converter according to an embodiment of the the present disclosure. As shown in FIG. 4, the driving circuit 320 includes an input voltage sensing unit 321, an oscillator 322, a logic unit, and a high-side driving unit 325.

The input voltage sensing unit 321 is used for generating an input voltage detection signal Vsen by detecting an input voltage Vin of the Boost-type converter. Oscillator 322 is used for generating a clock signal CLK with a large duty cycle. The logic unit receives the input voltage detection signal Vsen, the clock signal CLK and the pulse width modulated signal PWM, and generates a control signal according to the input voltage detection signal, the clock signal and the pulse width modulated signal. Specifically, the logic unit includes an AND gate 323 and an OR gate 324. The AND gate 323 has a first input terminal for receiving the input voltage detection signal Vsen and a second input terminal for receiving the clock signal CLK. The OR Gate 324 has a first input terminal being coupled to the output terminal of AND Gate 323, a second input terminal for receiving the pulse width modulated signal PWM, and an output terminal for providing the control signal. The high-side driving unit 325 is used for generating a driving signal HS_ON for a high-side switching transistor for driving the high side switching transistor Q2 according to the control signal.

Figure 5:
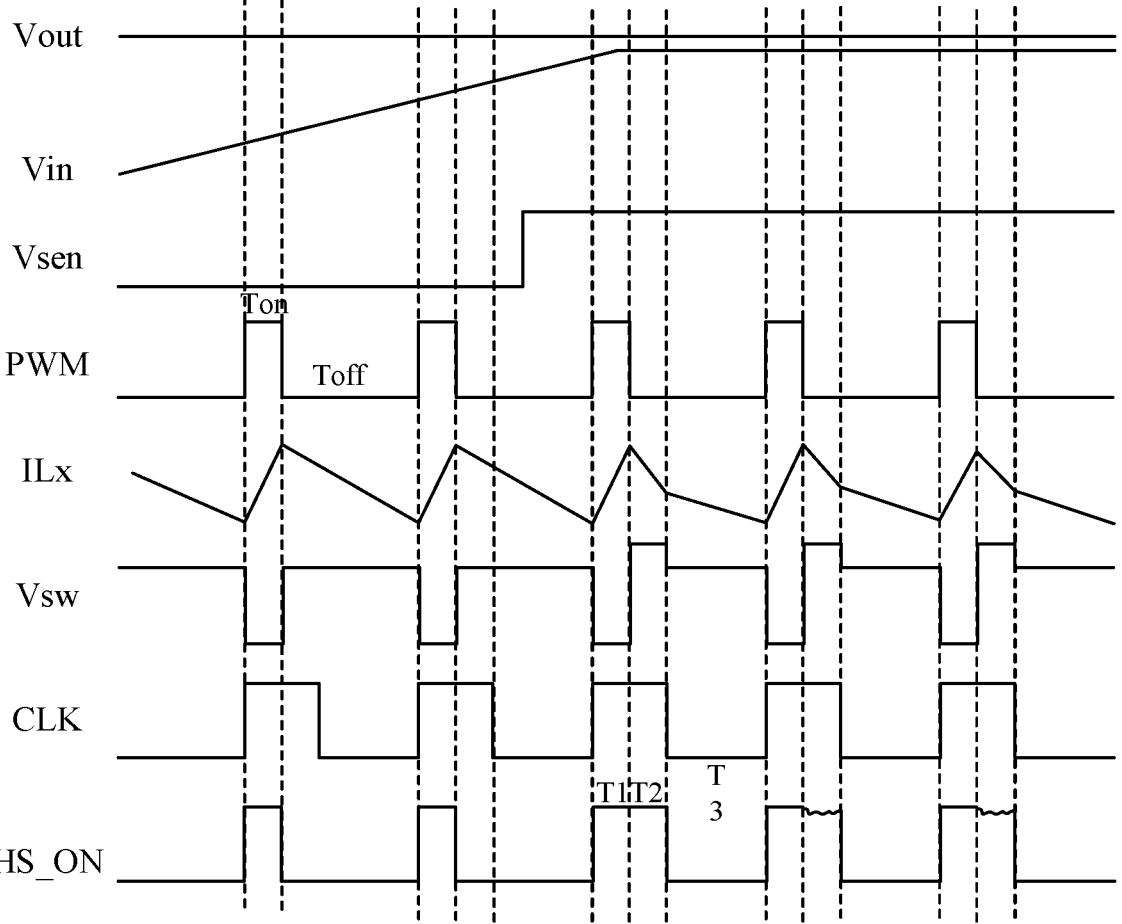
FIG. 5 is a schematic waveform chart of a synchronous rectification Boost-type converter according to the embodiment of the present disclosure.

FIG. 5 is a schematic waveform chart of a synchronous rectification Boost-type converter according to the embodiment of the present disclosure. In FIG. 5, waveforms of an input voltage Vin, an input voltage detection signal Vsen, a pulse width modulated signal PWM, an inductor current ILx, a switching node voltage VSW, a clock signal CLK, and a drive signal HS_ON for a high-side switching transistor are shown respectively.

As shown in FIG. 5, when the input voltage Vin is less than the predetermined voltage, the input voltage detection signal Vsen is at a low level, and the driving signal HS_ON for the high-side switching transistor only includes two time periods. For example, when the pulse width modulated signal PWM is at a high level, the low-side switching transistor is in an on state, the high-side switching transistor is in an off state, and the inductor current ILx is in a charging stage. When the pulse width modulated signal PWM is at low level, the low-side switching transistor is turned off, the high-side switching transistor is in an on state, and the inductor current ILx is in a discharge stage. Further, in FIG. 5, Ton denotes an on time of the low side switching transistor and Toff denotes an off time of the high side switching transistor.

Further, when the input voltage Vin is greater than the predetermined voltage, the input voltage detection signal Vsen is changed to a high level. In such a case, a switching cycle of the driving signal HS_ON for the high-side switching transistor has three time periods. For example, when the low side switching transistor is in the on time Ton, the driving signal HS_ON for the high-side switching transistor is in the first time period T1. Thus, the high side switching transistor is in the off state. When the low-side switching transistor is in the off-time Toff, the driving signal HS_ON for the high-side switching transistor includes a second time period T2 and a third time period T3. In the second time period T2, the high-side switching transistor is in a weak-conduction state or off state, and in the third time period T3, the high-side switching transistor is in a strong-conduction state, so that the waveforms of the switching node voltage VSW and the inductor current ILx can be changed. Thus, the switching node voltage VSW is larger than the output voltage Vout by a voltage value ΔVout in the second time period T2, ensuring that the on time Ton of the low-side input voltage will not become extremely small when the output voltage Vin gradually approaches the switching transistor Vout, and the system can function properly.

Figure 6:
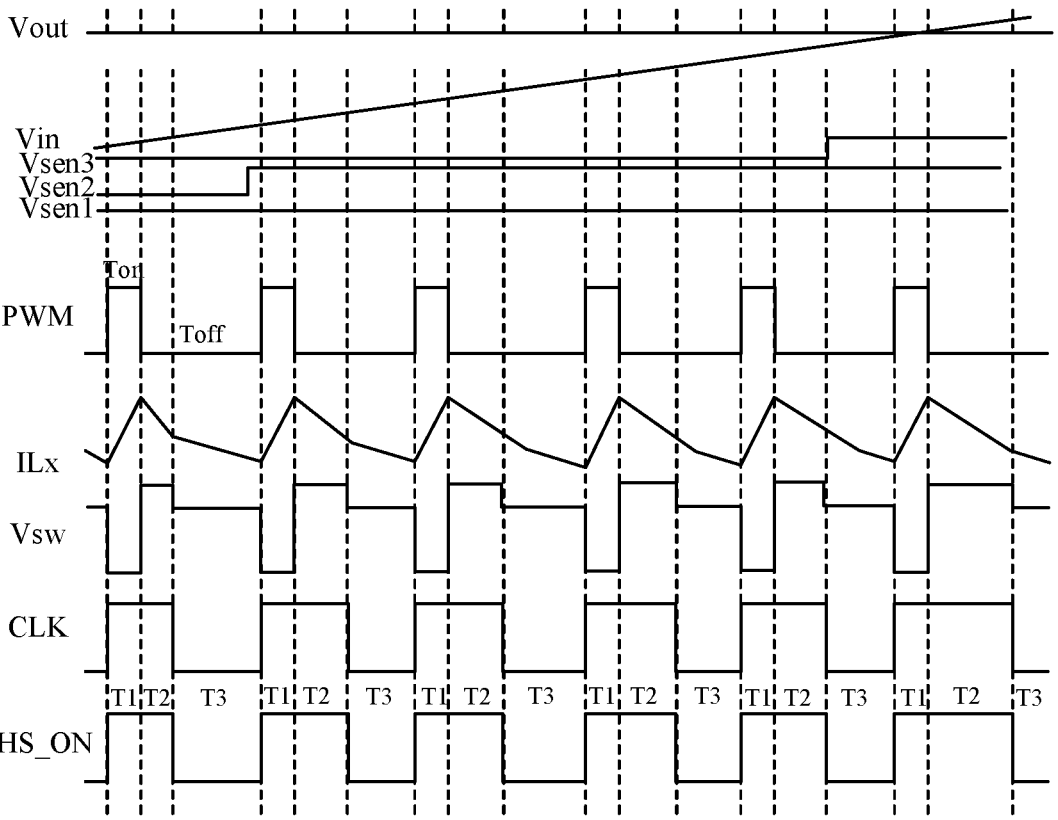
FIG. 6 is another schematic waveform chart of the synchronous rectification Boost-type converter according to the embodiment of the present disclosure.

FIG. 6 is another schematic waveform chart of the synchronous rectification Boost-type converter according to the embodiment of the present disclosure. In a further embodiment, when an input voltage Vin is greater than a predetermined voltage, the oscillator gradually increases a high-level duration of the clock signal CLK in a plurality of subsequent switching cycles, so as to achieve the purpose of gradually increasing an on time Ton of the low-side output voltage when the input voltage Vin approaches the switching transistor Vout, thereby avoiding the problem of system instability caused by too small on time Ton of the low-side switching transistor. Further, the oscillator gradually increases a high-level duration of the clock signal CLK in a plurality of switching cycles while keeping the high-level duration of the clock signal CLK unchanged in some of the switching cycles, so as to achieve the purpose of controlling the duration of the second time period T2 in segments. For example, three predetermined voltages can be set for the circuit. When the input voltage Vin is greater than the first predetermined voltage, the first input voltage detection signal Vsen1 is changed to a high level. In such a case, the driving signal HS_ON for the high-side switching transistor is controlled by three time periods T1 to T3, where the second time period T2 has a first duration. When the input voltage Vin is greater than the second predetermined voltage, the second input voltage detection signal Vsen2 is changed to a high level. In such a case, the second time period T2 is increased to a second duration. The second time period T2 is maintained as the second duration in a plurality of subsequent switching cycles. When the input voltage Vin is greater than the third predetermined voltage, the third input voltage detection signal Vsen3 is changed to a high level. In such a case, the second time period T2 is continuously increased to a third duration. Furthermore, the high-level duration of the clock signal CLK can be gradually increased by adjusting an equivalent resistance in the oscillator, so as to achieve the purpose of segmented control or linear control of the duration of the second time period T2.

Figure 7A:
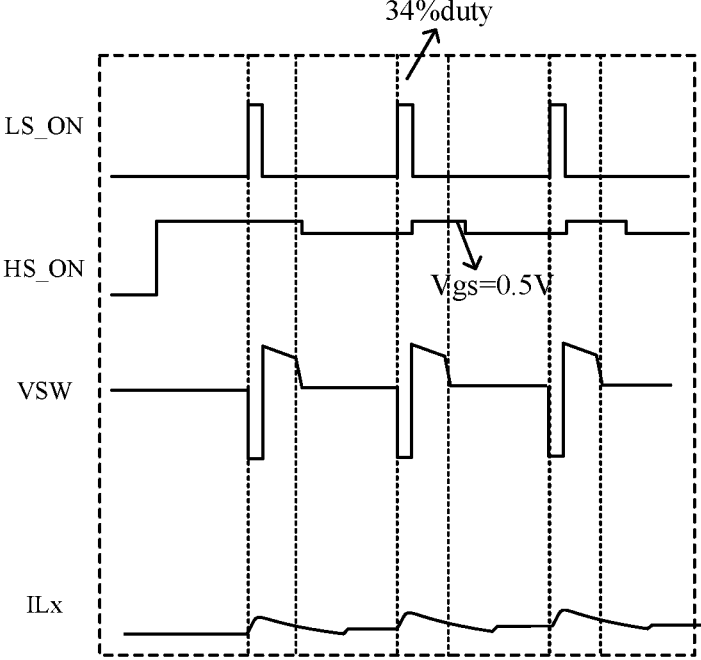
FIGS. 7a-7c are schematic waveform charts of the synchronous rectification Boost-type converter according to the embodiment of the present disclosure under different load conditions respectively.
Figure 7B:
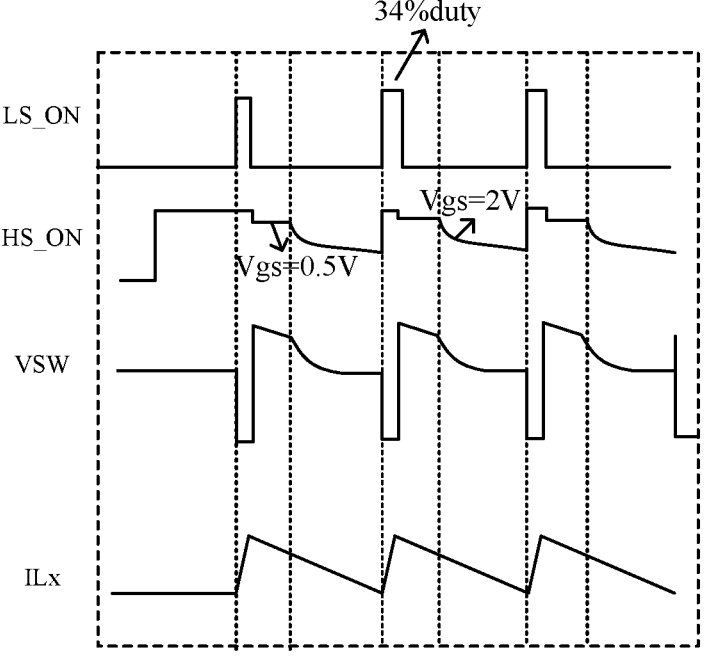
Figure 7C:
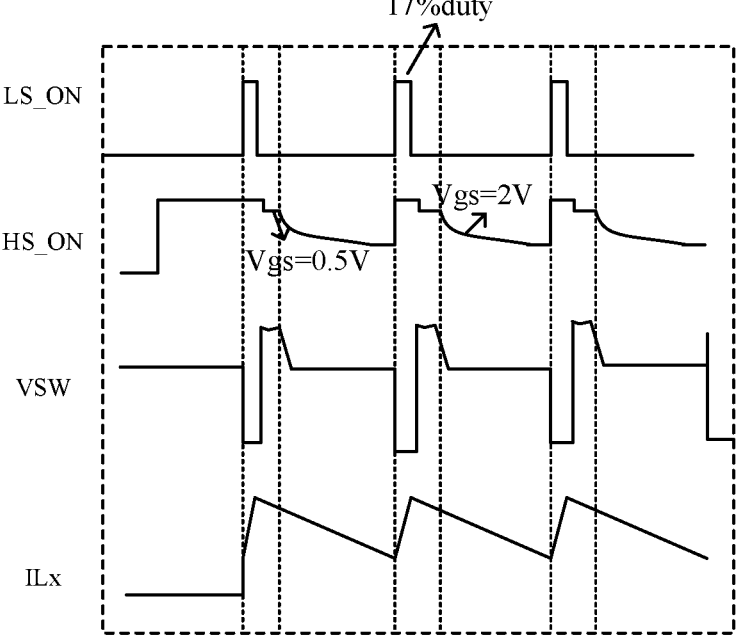

FIGS. 7a-7c are schematic waveform charts of the synchronous rectification Boost-type converter according to the embodiment of the present disclosure under different load conditions respectively. FIG. 7a is a schematic waveform chart of the synchronous rectification Boost-type converter according to the embodiment of the present disclosure under a light load condition, FIG. 7b is a schematic waveform chart of the synchronous rectification Boost-type converter according to the embodiment of the present disclosure under a normal load condition, and FIG. 7c is a schematic waveform chart of the synchronous rectification Boost-type converter according to the embodiment of the present disclosure under a heavy load condition. As shown in FIGS. 7a-7c, the Boost-type converter according to the embodiment of the present disclosure adopts the scheme of switching high-side switching transistor in a segmented manner when the input voltage is close to the output voltage. For example, the driving circuit provides the high-side switching transistor with a gate voltage slightly greater than the transistor's conduction threshold (e.g. Vgs=0.5V) to operate at a weak conduction state during the second time period of the inductor current discharge phase, and provides the high-side transistor with a gate voltage much greater than the transistor's conduction threshold (e.g. Vgs=2V) to operate at a strong-conduction state during the third time period, thereby greatly improving the efficiency of the system under heavy load conditions.

To sum up, in the Boost-type converter and the driving circuit for driving the high-side switching transistor according to the embodiments of the present disclosure, the driving circuit controls a gate voltage of the high-side switching transistor when an input voltage is close to an output voltage, so that the high-side switching transistor is in a weak-conduction state or off state at a time period of an inductor current discharge phase, thereby changing the waveform of the switching node and the inductor current. This ensures that the voltage at the switching node is greater than the output voltage during the time period, thereby solving the problem of a too small duty cycle of the low-side switching transistor when the input voltage is close to the output voltage, and enabling the system to function properly.

Furthermore, when the input voltage is close to the output voltage, the driving circuit of the present disclosure gradually increases the weak-conduction or off time of the high-side switching transistor in a plurality of switching cycles, thereby increasing a conduction time of the low-side switch transistor. This avoids the problem of current sampling failure caused by too short conduction time of the low-side switch transistor, which can lead to system instability. Thus, the system has improved stability.

In the above description, the well-known structural elements and steps are not explained in detail. However it will be understood by those skilled in the art that the corresponding structural elements and steps can be realized by various technical means. In addition in order to form the same structural elements those skilled in the art may devise methods that are not exactly the same as those described above. In addition although the embodiments are described separately above this does not mean that the measures in the embodiments cannot be advantageously used in combination.

These embodiments are not exhaustively described in all detail in accordance with the present disclosure's practices such as the above and are not limiting the disclosure to specific embodiments only. Obviously, according to the above description, many modifications and changes can be made. These embodiments are selected and specifically described in this specification in order to better explain the principle and practical application of the present disclosure, so that technicians in the technical field can make good use of the present disclosure and its modification based on the present disclosure. The scope of protection of the present disclosure rights shall be subject to the scope defined in the present disclosure's claims.

What is claimed is:

1. A driving circuit for driving a high-side switching transistor of a Boost-type converter, comprising:
   an input voltage sensing unit for detecting an input voltage of the Boost-type converter and generating an input voltage detection signal;
   an oscillator for generating a clock signal;
   a logic unit for receiving the input voltage detection signal, the clock signal and a pulse width modulated signal, and for generating a control signal according to the input voltage detection signal, the clock signal and the pulse width modulated signal; and
   a high-side driving unit for generating a driving signal of a high-side switching transistor for driving the high side switching transistor in a plurality of switching cycles according to the control signal,
   wherein, when the input voltage is greater than a predetermined voltage, the high-side driving unit controls the high-side switching transistor to be in a weak-conduction state at least at a time period of an inductor current discharge phase,
   wherein the oscillator gradually increases a high-level duration of the clock signal in a plurality of subsequent switching cycles to increase duration of the weak-conduction state when the input voltage is greater than the predetermined voltage.

2. The driving circuit according to claim 1, wherein when the input voltage is greater than the predetermined voltage, each of the plurality of switching cycles of the driving signal of the high-side switching transistor includes at least first to third time periods, so that the high-side switching transistor is in an off state in a first time period, in the weak-conduction state in a second time period, and in a strong-conduction state in a third time period.

3. The driving circuit according to claim 2, wherein, when the input voltage is greater than the predetermined voltage, the high-side driving unit provides a gate voltage to the high-side switching transistor in the second time period is slightly greater than a conduction threshold of the high-side switching transistor, so that the high-side switching transistor is in a weak-conduction state.

4. The driving circuit according to claim 1, wherein the oscillator gradually increases the high-level duration of the clock signal in the plurality of switching cycles while keeping the high-level duration of the clock signal unchanged in some of the plurality of switching cycles.

5. The driving circuit according to claim 1, wherein the logic unit comprises:
   an AND gate having a first input terminal for receiving the input voltage detection signal, a second input terminal for receiving the clock signal, and an output terminal; and
   an OR gate having a first input terminal being coupled to the output terminal of the AND gate, a second input terminal for receiving the pulse width modulated signal, and an output terminal for outputting the control signal.

6. A Boost-type converter, comprising:

the high-side switching transistor and the driving circuit according to claim 1, the driving circuit driving the high-side switching transistor according to the pulse width modulated signal;

a low-side switching transistor, wherein a source of the high-side switching transistor is coupled with an output voltage, a drain of the high-side switching transistor is coupled with a drain of the low-side switching transistor, a source of the low-side switching transistor is coupled to the ground, and an intermediate node between the high-side switching transistor and the low-side switching transistor is a switching node;

an inductor which has a first end being coupled with the input voltage, and a second end being coupled with the switching node;

an error amplifier which compares a feedback voltage of the output voltage with a reference voltage to obtain an error voltage between the feedback voltage and the reference voltage; and a control circuit which generates a pulse width modulated signal according to the error signal to control on and off states of the high-side switching transistor and the low-side transistor.

7. The Boost-type converter according to claim 6, further comprising:

a substrate control circuit for comparing the input voltage with the output voltage and controlling a substrate bias of the high-side switching transistor according to the comparison result.

8. The Boost-type converter according to claim 7, wherein the substrate control circuit controls the high-side switching transistor to couple its substrate with its source when the input voltage is less than or equal to the output voltage, the substrate control circuit controls the high-side switching transistor to couple its substrate with its drain when the input voltage is greater than the output voltage.

9. The Boost-type converter according to claim 6, wherein the driving circuit is further configured to detect an output current and control a gate voltage of the high-side switching transistor according to the output current to adjust a forward voltage drop of the high-side switching transistor.

* * * * *